US 8,719,828 B2

(12) United States Patent
Lewis et al.

(10) Patent No.: US 8,719,828 B2
(45) Date of Patent: May 6, 2014

(54) METHOD, APPARATUS, AND SYSTEM FOR ADAPTIVE THREAD SCHEDULING IN TRANSACTIONAL MEMORY SYSTEMS

(75) Inventors: Brian T. Lewis, Palo Alto, CA (US); Bratin Saha, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 93 days.

(21) Appl. No.: 13/273,695

(22) Filed: Oct. 14, 2011

(65) Prior Publication Data
US 2013/0097607 A1 Apr. 18, 2013

(51) Int. Cl.
*G06F 9/46* (2006.01)

(52) U.S. Cl.
USPC .......................................... 718/102; 718/101

(58) Field of Classification Search
None
See application file for complete search history.

(56) References Cited

U.S. PATENT DOCUMENTS

| | | | |
|---|---|---|---|
| 2005/0108711 A1* | 5/2005 | Arnold et al. ............. | 718/100 |
| 2006/0288350 A1* | 12/2006 | Grigorovitch et al. ........ | 718/107 |
| 2007/0136289 A1* | 6/2007 | Adl-Tabatabai et al. ......... | 707/8 |
| 2007/0156780 A1* | 7/2007 | Saha et al. ............. | 707/202 |
| 2008/0294884 A1* | 11/2008 | Bishop et al. ............. | 712/245 |
| 2008/0301250 A1* | 12/2008 | Hardy et al. ............. | 709/207 |
| 2009/0070774 A1* | 3/2009 | Raikin et al. ............. | 718/108 |
| 2009/0138670 A1* | 5/2009 | Mutlu et al. ............. | 711/167 |
| 2009/0172303 A1* | 7/2009 | Welc et al. ............. | 711/154 |
| 2010/0138841 A1* | 6/2010 | Dice et al. ............. | 718/107 |
| 2010/0174840 A1* | 7/2010 | Blainey et al. ............. | 710/121 |
| 2011/0016470 A1* | 1/2011 | Cain et al. ............. | 718/101 |
| 2011/0023039 A1* | 1/2011 | Memik et al. ............. | 718/102 |
| 2011/0055479 A1* | 3/2011 | West et al. ............. | 711/118 |
| 2011/0107340 A1* | 5/2011 | Gupta et al. ............. | 718/102 |
| 2011/0209155 A1* | 8/2011 | Giampapa et al. ............ | 718/103 |
| 2011/0225592 A1* | 9/2011 | Goldin ............. | 718/104 |
| 2011/0317712 A1* | 12/2011 | Mejdrich et al. ............. | 370/412 |
| 2012/0179877 A1* | 7/2012 | Shriraman et al. ............ | 711/141 |
| 2012/0192195 A1* | 7/2012 | El-Moursy et al. .......... | 718/103 |
| 2012/0203851 A1* | 8/2012 | Hardy et al. ............. | 709/206 |
| 2013/0019083 A1* | 1/2013 | Cain et al. ............. | 712/203 |

OTHER PUBLICATIONS

Saha et al. "McRT-STM: a high performance software transactional memory system for a multi-core runtime", In Proceedings of the eleventh ACM SIGPLAN symposium on Principles and Practice of Parallel Programming, Mar. 2006, New York.

(Continued)

*Primary Examiner* — Emerson Puente
*Assistant Examiner* — Mehran Kamran
(74) *Attorney, Agent, or Firm* — Grossman, Tucker, Perreault & Pfleger, PLLC

(57) ABSTRACT

An apparatus and method is described herein for adaptive thread scheduling in a transactional memory environment. A number of conflicts in a thread over time are tracked. And if the conflicts exceed a threshold, the thread may be delayed (adaptively scheduled) to avoid conflicts between competing threads. Moreover, a more complex version may track a number of transaction aborts within a first thread that are caused by a second thread over a period, as well as a total number of transactions executed by the first thread over the period. From the tracking, a conflict ratio is determined for the first thread with regard to the second thread. And when the first thread is to be scheduled, it may be delayed if the second thread is running and the conflict ratio is over a conflict ratio threshold.

27 Claims, 7 Drawing Sheets

(56) References Cited

OTHER PUBLICATIONS

Herlihy et al. "Software Transactional Memory for Dynamic-Sized Data Structures", In Proceedings of the Twenty-Second Annual ACM SIGACT-SIGOPS Symposium on Principles of Distributed Computing, Jul. 2003, New York.

Yoo et al. "Adaptive Transaction Scheduling for Transactional Memory Systems", In Proceedings of the Twentieth Annual Symposium on Parallelism in Algorithms and Architectures, Jun. 2008, Munich, Germany.

Rossbach et al. "TxLinux: Using and Managing Hardware Transactional Memory in an Operating System", In Proceedings of the Symposium on Operating System Principles, Oct. 2007, Stevenson, Washington.

Xian et al. "Contention-Aware Scheduler: Unlocking Execution Parallelism in Multithreaded Java Programs", In Proceedings of the 23rd ACM SIGPLAN Conference on Object-Oriented Programming Systems Languages and Applications, 2008, Nashville, Tennessee.

\* cited by examiner

METHOD, APPARATUS, AND SYSTEM FOR ADAPTIVE THREAD SCHEDULING IN TRANSACTIONAL MEMORY SYSTEMS

FIELD

This disclosure pertains to the field of integrated circuits and, in particular, to parallel execution in processors.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. Either way, after extrapolating this simple example into a large scalable program, it is apparent that the complexity of lock contention, serialization, fine-grain synchronization, and deadlock avoidance become extremely cumbersome burdens for programmers.

Another recent data synchronization technique includes the use of transactional memory (TM). Often transactional execution includes executing a grouping of a plurality of micro-operations, operations, or instructions atomically. In the example above, both threads execute within the hash table, and their memory accesses are monitored/tracked. If both threads access/alter the same entry, conflict resolution may be performed to ensure data validity. One type of transactional execution includes Software Transactional Memory (STM), where tracking of memory accesses, conflict resolution, abort tasks, and other transactional tasks are performed in software, often without the support of hardware. Another type of transactional execution includes a Hardware Transactional Memory (HTM) System, where hardware is included to support access tracking, conflict resolution, and other transactional tasks.

As can be seen, TM has the potential to provide better performance among multiple threads. However, performance may become degraded if too many transactions abort due to data conflicts between threads. In other words, the cost of transaction aborts (i.e. rolling back of architecture and memory state to a point before a transaction) is potentially time consuming. And although some aborts are often part of achieving the highest parallel performance possible, too many aborts may result in spending more time aborting transactions than the benefit of executing without locks. Traditionally, if a transaction aborts too many times, execution reverts back to lock-based execution. Yet, there has been no attempt to efficiently schedule threads to minimize (or avoid in some cases) conflicts between parallel threads.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth, such as examples of specific types of specific processor configurations, specific hardware structures, specific architectural and micro architectural details, specific register configurations, specific conflict formulas, specific types of controlling software, etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific power unit implementation details, specific operation of decoders, specific format of instructions and other specific operational details of processors haven't been described in detail in order to avoid unnecessarily obscuring the present invention.

Although the following embodiments are described with reference to a processor, other embodiments are applicable to other types of integrated circuits and logic devices. Similar techniques and teachings of embodiments described herein may be applied to other types of circuits or semiconductor devices that can benefit from higher pipeline throughput and improved performance. For example, the disclosed embodiments are not limited to computer systems. And may be also used in other devices, such as handheld devices and embedded applications. Some examples of handheld devices include cellular phones, Internet protocol devices, digital cameras, personal digital assistants (PDAs), and handheld PCs. Embedded applications include a microcontroller, a digital signal processor (DSP), a system on a chip, network computers (NetPC), set-top boxes, network hubs, wide area network (WAN) switches, or any other system that can perform the functions and operations taught below The method and apparatus described herein are for adaptively scheduling threads to minimize conflicts. Specifically, adaptive thread scheduling is discussed with regard to transactional execution with a microprocessor, such as processor 100. Yet, the apparatus' and methods described herein are not so limited, as they may be implemented in conjunction with alternative processor architectures, as well as any device including multiple processing elements. For example, adaptive thread scheduling may be implemented in other types of integrated circuits and logic devices. Or it may be utilized in small form-factor devices, handheld devices, or embedded applications. Additionally, adaptive thread scheduling may also be implemented for scheduling of threads that are not related to transactional execution. As an example, threads are scheduled to minimize thrashing in caches or other shared resources in a similar manner as described below.

Figure 1:
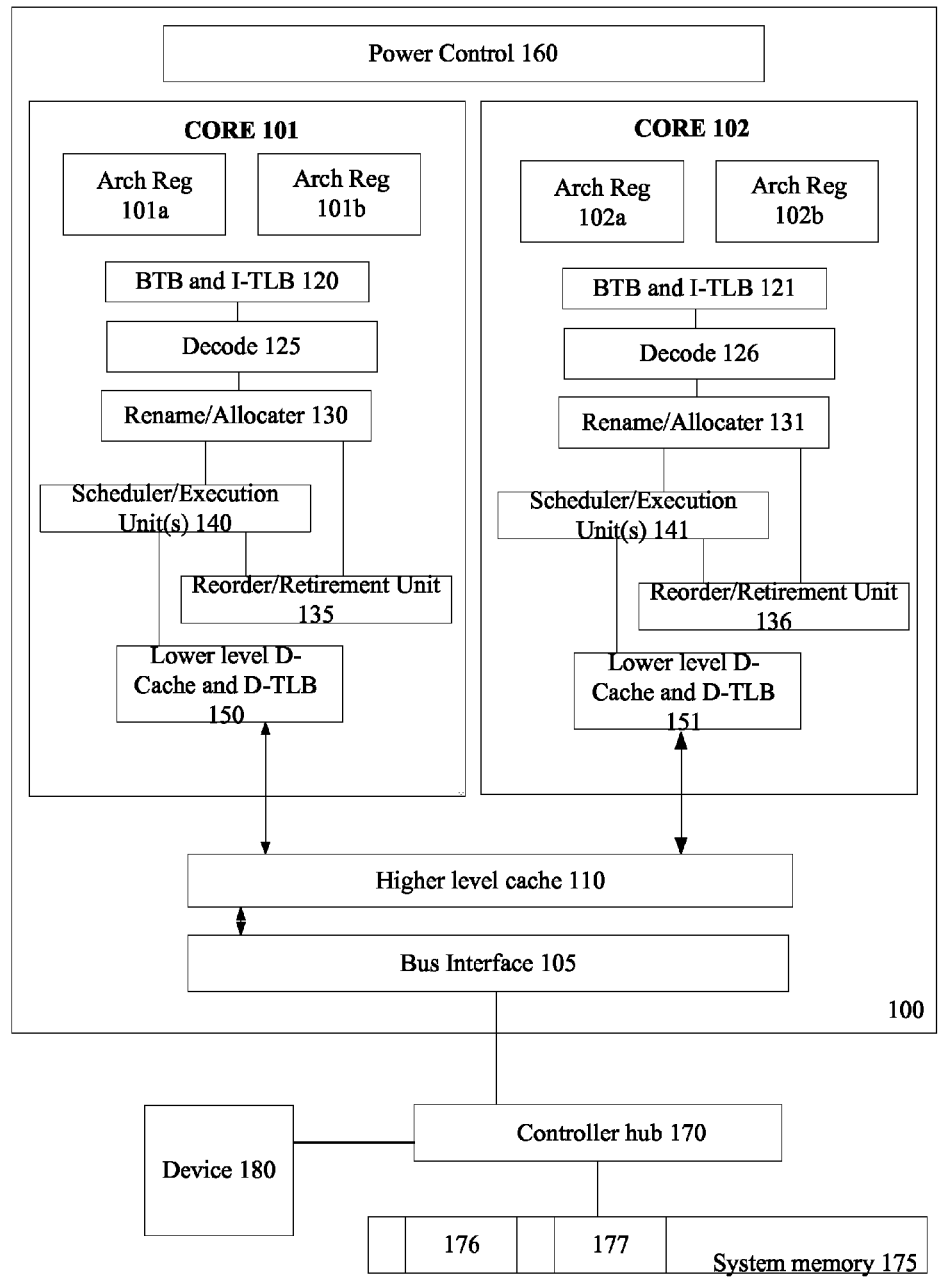
FIG. 1 illustrates an embodiment of a logical representation of a system including processor having multiple processing elements (2 cores and 4 thread slots).

Referring to FIG. 1, an embodiment of a processor including multiple cores is illustrated. Processor 100 includes any processor or processing device, such as a microprocessor, an embedded processor, a digital signal processor (DSP), a network processor, a handheld processor, or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. Yet to further the discussion, the functional units illustrated in core 101 are described in further detail below, as the units in core 102 operate in a similar manner.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e. four logical processors or processing elements capable of executing four software threads concurrently. As eluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in rename allocater logic 130 may also be replicated for threads 101a and 101b. Some resources, such as reorder buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first Instruction Set Architecture (ISA), which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order. In one embodiment, adaptive thread scheduling includes delaying dispatch of an instruction of a thread from a buffer, such as a load or store buffer, which causes scheduling to be subsequently delayed, when the thread has recently conflicted with currently running threads too often.

Scheduler and execution unit(s) block 140, in one embodiment, includes a scheduler unit to schedule instructions/operation on execution units. For example, a floating point instruction is scheduled on a port of an execution unit that has an available floating point execution unit. In one embodiment, which is described in more detail below, scheduler 140 is configured to adaptively schedule and/or delay threads for execution that conflict too much with already running/scheduled threads. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

In the depicted configuration, processor 100 also includes bus interface module 105 to communicate with devices external to processor 100, such as system memory 175, a chipset (often including a memory controller hub to connect to memory 175 and an I/O controller hub to connect peripheral devices), a memory controller hub, a northbridge, or other integrated circuit. Bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus. Memory 175 may be dedicated to processor 100 or shared with other devices in a system. Common examples of types of memory 175 include dynamic random access memory (DRAM), static RAM (SRAM), non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Note that in the depicted embodiment, the controller hub and memory are illustrated outside of processor 100. However, the implementations of the methods and apparatus' described herein are not so limited. In fact, as more logic and devices are being integrated on a single die, such as System on a Chip (SOC), each of these devices may be incorporated on processor 100. For example in one embodiment, memory controller hub is on the same package and/or die with processor 100. Here, a portion of the core (an on-core portion) includes a controller hub for interfacing with other devices such as a controller hub. In the SOC environment, even more devices, such as the network interface, co-processors, and any other known computer devices/interface may be integrated on a single die or integrated circuit to provide small form factor with high functionality and low power consumption.

In one embodiment, processor 100 is capable of hardware transactional execution, software transactional execution, or a combination/hybrid thereof. A transaction, which may also be referred to as execution of a critical or atomic section/region of code, includes a grouping of instructions or operations to be executed as an atomic group. For example, instructions or operations may be used to demarcate a transaction or a critical section. In one embodiment, which is described in more detail below, these instructions are part of a set of instructions, such as an Instruction Set Architecture (ISA), which are recognizable by hardware of processor 100, such as decoders described above. Often, these instructions, once compiled from a high-level language to hardware recognizable assembly language include operation codes (opcodes), or other portions of the instructions, that decoders recognize during a decode stage.

Typically, during execution of a transaction, updates to memory are not made globally visible until the transaction is committed. As an example, a transactional write to a location is potentially visible to a local thread; yet, in response to a read from another thread the write data is not forwarded until the transaction including the transactional write is committed. While the transaction is still pending, data items/elements loaded from and written to within a memory are tracked, as discussed in more detail below. Once the transaction reaches a commit point, if conflicts have not been detected for the transaction, then the transaction is committed and updates made during the transaction are made globally visible. However, if the transaction is invalidated during its pendency, the transaction is aborted and potentially restarted without making the updates globally visible. As a result, pendency of a transaction, as used herein, refers to a transaction that has begun execution and has not been committed or aborted, i.e. pending.

A Software Transactional Memory (STM) system often refers to performing access tracking, conflict resolution, or other transactional memory tasks within or at least primarily through execution of software or code. In one embodiment, processor 100 is capable of executing transactions utilizing hardware/logic, i.e. within a Hardware Transactional Memory (HTM) system. Numerous specific implementation details exist both from an architectural and microarchitectural perspective when implementing an HTM; most of which are not discussed herein to avoid unnecessarily obscuring the discussion. However, some structures, resources, and implementations are disclosed for illustrative purposes. Yet, it should be noted that these structures and implementations are not required and may be augmented and/or replaced with other structures having different implementation details. Another execution technique closely related to transactional memory includes lock elision (often referred to as hardware lock elision (HLE)). In this scenario, lock instruction pairs (lock and lock release) are replaced (either by a user, software, or hardware) with atomic start and end delineators. And the section of code between the lock instruction pairs is executed like a transaction.

As a combination, processor 100 may be capable of executing transactions using a hybrid approach (both hardware and software), such as within an unbounded transactional memory (UTM) system, which attempts to take advantage of the benefits of both STM and HTM systems. For example, an HTM is often fast and efficient for executing small transactions, because it does not rely on software to perform all of the access tracking, conflict detection, validation, and commit for transactions. However, HTMs are usually only able to handle smaller transactions, while STMs are able to handle larger size transactions, which are often referred to as unbounded sized transactions. Therefore, in one embodiment, a UTM system utilizes hardware to execute smaller transactions and software to execute transactions that are too big for the hardware. As can be seen from the discussion below, even when software is handling transactions, hardware may be utilized to assist and accelerate the software; this hybrid approach is commonly referred to as a hardware accelerated STM, since the primary transactional memory system (bookkeeping, etc) resides in software but is accelerated using hardware hooks.

Figure 2:
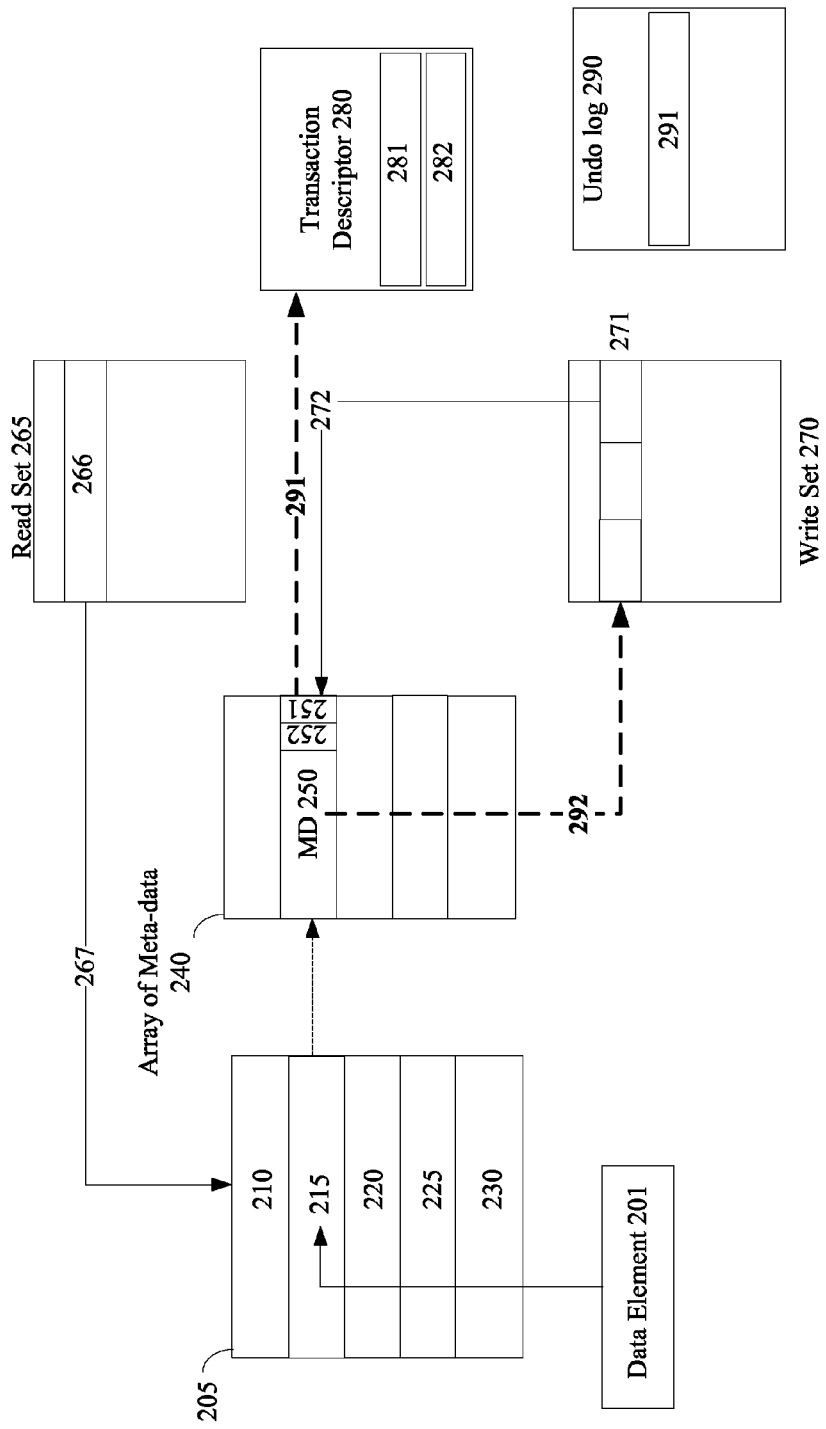
FIG. 2 illustrates an embodiment of a logical representation of software transactional memory system and hardware structures to support execution thereof.

Referring briefly to FIG. 2, a simplified illustrative embodiment of a STM system is depicted. Note that the discussion of FIG. 2 is primarily in reference to an optimistic read STM system. In that regard, discussion of certain transactional memory implementation details, such as direct versus indirect referencing, optimistic versus pessimistic concurrency control, and update-in place versus write-buffering are provided to illustrate a few of the design choices that may be made when implementing a transactional memory system. However, the methods and apparatus described herein may be implemented for any transactional memory system, such as an HTM, a hardware accelerated STM, a hybrid STM, a pessimistic STM, or other known transactional memory system, as well as in conjunction with any known implementation details.

In one embodiment of an STM, memory locations (addresses), data items and/or data elements, such as data element 201 to be held in cache line 215, are associated with meta-data locations, such as meta-data location 250 in array 240. As an illustrative example, an address, or a portion thereof, associated with data element 201 and/or line 215 of cache memory 205 is hashed to index location 250 in array 240. Often, in regards to transactional memory, meta-data location 250 is referred to as a transaction record, while array 240 is referred to as an array of transaction records. Yet, metadata for an entire transaction may include information about the transaction itself, such as the transaction description 280, read set 265, and write set 270, which are described in more detail below. Although transaction record 250, as illustrated, is associated with a single cache line, a transaction record may be provided at any data granularity level, such as a size of data element 201, which may be smaller or larger than cache line 215, as well as include an operand, an object, a class, a type, a data structure, or any other element of data.

A data item, data object, or data element, such as data item 201, may include data at any granularity level, as defined by hardware, software or a combination thereof. A non-exhaustive list of examples of data, data elements, data items, or references thereto, include a memory address, a data object, a class, a field of a type of dynamic language code, a type of dynamic language code, a variable, an operand, a data structure, and an indirect reference to a memory address. However, any known grouping of data may be referred to as a data element or data item. A few of the examples above, such as a field of a type of dynamic language code and a type of dynamic language code refer to data structures of dynamic language code. To illustrate, dynamic language code, such as Java™ from Sun Microsystems, Inc, is a strongly typed language. Each variable has a type that is known at compile time. The types are divided in two categories—primitive types (boolean and numeric, e.g., int, float) and reference types (classes, interfaces and arrays). The values of reference types are references to objects. In Java™, an object, which consists of fields, may be a class instance or an array. Given object a of class A it is customary to use the notation A::x to refer to the field x of type A and a·x to the field x of object a of class A. For example, an expression may be couched as a·x=a·y+a·z. Here, field y and field z are loaded to be added and the result is to be written to field x.

Therefore, monitoring/buffering memory accesses to data items may be performed at any of data level granularity. For example in one embodiment, memory accesses to data are monitored at a type level. Here, a transactional write to a field A::x and a non-transactional load of field A::y may be monitored as accesses to the same data item, i.e. type A. In another embodiment, memory access monitoring/buffering is performed at a field level granularity. Here, a transactional write to A::x and a non-transactional load of A::y are not monitored as accesses to the same data item, as they are references to separate fields. Note, other data structures or programming techniques may be taken into account in tracking memory accesses to data items. As an example, assume that fields x and y of object of class A (i.e. A::x and A::y) point to objects of class B, are initialized to newly allocated objects, and are never written to after initialization. In one embodiment, a transactional write to a field B::z of an object pointed to by A::x are not monitored as memory access to the same data item in regards to a non-transactional load of field B::z of an object pointed to by A::y. Extrapolating from these examples, it is possible to determine that monitors may perform monitoring/buffering at any data granularity level.

Often in a STM, transaction record (TR) 250 (also referred to as a transactional lock) is utilized to provide different levels of ownership of and access to an associated memory address, such as data element 201. In one embodiment, TR 250 holds a first value to represent an unlocked or un-owned state and holds a second value to represent a locked or owned state. In some implementations, TR 250 may be capable of multiple different levels of locked or owned states, such as a write lock/exclusive lock state to provide exclusive ownership to a single owner, a read lock where reader(s) read data element 201 while allowing others to still read but not write data element 201, and a read lock with intent to upgrade to a write/exclusive lock state where a potential writer wants to acquire an exclusive write-lock but is waiting for current readers to release data element 201.

The values utilized to represent unlocked states and locked states in TR 250 vary based on the implementation. For example, in one embodiment of an optimistic concurrency control STM, TR 250 holds a version or timestamp value (e.g. a value representing the most recent committed transaction that updated data element 201) to indicate an unlocked state. And TR 250 holds a reference, such as a pointer, to a transaction descriptor, such as transaction descriptor 280, to represent a locked state. Usually, transaction descriptor 280 holds information describing a transaction, such as transaction ID 281 and transaction state 282. The above described example of utilizing a pointer to transaction descriptor 280 is often be referred to as a direct reference STM, where transaction record 250 holds a direct reference to owning transaction 281.

In another embodiment, an owned or locked value includes a reference to a write set entry, such as write entry 271 of write set 270. In one embodiment, write entry 271 is to hold a logged version number from transaction record 250 before the lock is acquired; a pointer to transaction descriptor 280 to indicate that transaction 281 is associated with write entry 271; and a back pointer to transaction record 250. This example is often referred to as an indirect reference STM, where TR 250 references an owning transaction indirectly, i.e. through write entry 271.

In contrast to a version or pointer value in TR 250, in one embodiment of a pessimistic concurrency control STM, TR 250 holds a bit vector/map, where higher order bits represent executing transactions (or threads executing transactions), while LSB 251 and $2^{nd}$ LSB 252 represent a write lock state, an unlocked state, and a read upgrade to write lock state. In an unlocked state, the higher bits that are set represent corresponding transactions that have read data element 201. In a locked state, one of the higher bits are set to indicate which of the transactions has write locked data element 201.

In one embodiment, an access barrier is executed upon a memory access to data element 201 to ensure proper access and data validity. Here, an ownership test is often performed to determine the ownership state of TR 250. In one embodiment, a portion of TR 250, such as LSB 251 and/or $2^{nd}$ LSB 252, is utilized to indicate availability of data element 201. To illustrate, when LSB 251 holds a first value, such as a logical zero, then TR 250 is unlocked, and when LSB 251 holds a second value, such as a logical one, then TR 250 is locked. In this example, second LSB 252 may be utilized to indicate when a read owner intends to upgrade to an exclusive write lock. Alternatively, the combination of bits 251-252, as well as other bits, may be utilized to encode different ownership states, such as the multiple lock states described above.

In one embodiment, barriers at memory accesses perform bookkeeping in conjunction with the ownership tests described above. For example, upon a read of data element 201, an ownership test is performed on TR 250. If unlocked, i.e. holding a version value in an optimistic concurrency control STM, the version value is logged in read entry 265 of read set 266. Later, upon validation, which may be on-demand during pendency of the transaction or at commit of the transaction, a current value of TR 250 is compared to the logged value in entry 266. If the values are different, then either another owner has locked TR 250 and/or modified data element 201, which results in a potential data conflict. Additionally, a write barrier may perform similar bookkeeping operations for a write to data element 201, such as performing an ownership test, acquiring a lock, indicating an intent to upgrade the lock, managing write set 270, etc.

Previously, at the end of a transaction, a commit of the transaction is attempted. As an example, a read set is validated to ensure locations read from during pendency of the transaction are valid. In other words, a logged version value held in read entry 266 is compared against a current value held in transaction record 250. If the current value is the same as the logged version, then no other access has updated data element 201. Consequently, the read associated with entry 266 is determined to be valid. If all the memory accesses are determined to be valid, then the transaction is committed and/or retired.

However, if the versions are different and the current transaction did not read and then write to the data element, then another transaction either acquired a lock of TR 250 and/or modified data element 201. As a result, the transaction may then be aborted. Once again, depending on the implementation of the STM, the operations performed by the commit and abort functions may be interchangeable. For example, in a write-buffering STM, writes during a pendency of the transaction are buffered, and upon commit they are copied into the corresponding memory locations. Here, when the transaction is aborted, new values in the write-buffer are discarded. Inversely, in an update-in-place STM, the new values are held in the corresponding memory locations, while the old values are logged in a write log. Here, upon abort, the old values are copied back to the memory locations, and on a commit, the old values in the write log are discarded.

Whether in a write-buffering STM or in an update-in-place STM, when roll-back of updated memory locations is needed, often an undo log, such as undo log 290 is utilized. As an example, undo log 290 includes entries, such as entry 291, to track updates to memory during a transaction. To illustrate, in an update-in-place STM, memory locations are updated directly. However, upon an abort, the updates are discarded based on undo log 290. In one embodiment, undo log 290 is capable of rolling back nested transactions. Here, undo log 290 potentially rolls back a nested transaction without invalidating higher/outer level transactions, such as rolling back to a checkpoint immediately before the start of the nested transaction.

As stated above, transactions include transactional memory accesses to data items both by local processing elements, as well as potentially by other processing elements. Without safety mechanisms in a transactional memory system, some of these accesses may result in invalid data and execution, i.e. a write to data invalidating a read, or a read of invalid data. In a pure STM system, these safety mechanisms exist through the construct of the software barriers described above. In an HTM or hybrid HTM/STM, hardware monitors in conjunction with protocols (such as existing cache coherency protocols) and/or software barriers provides such safety mechanisms.

Although FIG. 2 primarily depicts an STM environment, it is also useful in discussing hardware acceleration for an STM. For example, cache lines 210-230, in one embodiment, are associated with transactional attributes. These attributes may be persistent through memory (i.e. part of cache lines 215 that exists throughout a memory hierarchy) or not persistent (i.e. local within cache 205 and lost upon eviction of cache line 215). Additionally, these attributes may be part of lines 215 or associated with line 215, such as additional bits in a state array for data array 205. Or, in one embodiment, attributes include bits that are configured to be operated on by software instructions for tacking an acceleration. For example, a transactional read bit and a transactional write bit are provided to be set upon transactional reads and writes, respectively. Here, software may check the status of a transactional read bit to determine if the current transaction has already read cache line 215. And if the bit is set (indicating cache line 215 has already been accessed), then the software elides read barrier operations, such as checking transaction record 250, logging transaction record value 250 in read set 265, etc. Here, subsequent software transactional accesses to the same memory address within a transaction are accelerated using hardware attributes that the software is able to access, interpret, and act upon accordingly.

Returning the discussion to FIG. 1, in one embodiment, processor 100 includes monitors to detect or track accesses, and potential subsequent conflicts, associated with data items. Note these monitors, in one embodiment, are the same attributes (or included with) the attributes described above for acceleration of an STM. In this scenario, monitors may double as hardware tracking and software acceleration support. For example, hardware of processor 100 includes read monitors and write monitors to track loads and stores, which are determined to be monitored, accordingly. Hardware read monitors and write monitors may monitor data items at a granularity of the data items despite the granularity of underlying storage structures. Or alternatively, they monitor at the storage structure granularity. In one embodiment, a data item is bounded by tracking mechanisms associated at the granularity of the storage structures to ensure the at least the entire data item is monitored appropriately.

As a specific illustrative example, read and write monitors include attributes associated with cache locations, such as locations within lower level data cache 150 (which may include a speculative cache), to monitor loads from and stores to addresses associated with those locations. Here, a read attribute for a cache location of data cache 150 is set upon a read event to an address associated with the cache location to monitor for potential conflicting writes to the same address. In this case, write attributes operate in a similar manner for write events to monitor for potential conflicting reads and writes to the same address. To further this example, hardware is capable of detecting conflicts based on snoops for reads and writes to cache locations with read and/or write attributes set to indicate the cache locations are monitored. Inversely, setting read and write monitors, or updating a cache location to a buffered state, in one embodiment, results in snoops, such as read requests or read for ownership requests, which allow for conflicts with addresses monitored in other caches to be detected.

Therefore, based on the design, different combinations of cache coherency requests and monitored coherency states of cache lines result in potential conflicts, such as a cache line holding a data item in a shared read monitored state and a snoop indicating a write request to the data item. Inversely, a cache line holding a data item being in a buffered write state and an external snoop indicating a read request to the data item may be considered potentially conflicting. In one embodiment, to detect such combinations of access requests and attribute states snoop logic is coupled to conflict detection/reporting logic, such as monitors and/or logic for conflict detection/reporting, as well as status registers to report the conflicts.

However, any combination of conditions and scenarios may be considered invalidating for a transaction. Examples of factors, which may be considered for non-commit of a transaction, includes detecting a conflict to a transactionally accessed memory location, losing monitor information, losing buffered data, losing metadata associated with a transactionally accessed data item, and detecting an other invalidating event, such as an interrupt, ring transition, or an explicit user instruction.

In one embodiment, hardware of processor 100 is to hold transactional updates in a buffered manner. As stated above, transactional writes are not made globally visible until commit of a transaction. However, a local software thread associated with the transactional writes is capable of accessing the transactional updates for subsequent transactional accesses. As a first example, a separate buffer structure is provided in processor 100 to hold the buffered updates, which is capable of providing the updates to the local thread and not to other external threads.

In contrast, as another example, a cache memory, such as data cache 150, is utilized to buffer the updates, while providing the same transactional functionality. Here, cache 150 is capable of holding data items in a buffered coherency state; in one case, a new buffered coherency state is added to a cache coherency protocol, such as a Modified Exclusive Shared Invalid (MESI) protocol to form a MESIB protocol. In response to local requests for a buffered data item—data item being held in a buffered coherency state, cache 150 provides the data item to the local processing element to ensure internal transactional sequential ordering. However, in response to external access requests, a miss response is provided to ensure the transactionally updated data item is not made globally visible until commit. Furthermore, when a line of cache 150 is held in a buffered coherency state and selected for eviction, the buffered update is not written back to higher level cache memories—the buffered update is not to be proliferated through the memory system, i.e. not made globally visible, until after commit. Instead, the transaction may abort or the evicted line may be stored in a speculative structure between the data cache and the higher level cache memories, such as a victim cache. Upon commit, the buffered lines are transitioned to a modified state to make the data item globally visible.

Note that the terms internal and external are often relative to a perspective of a thread associated with execution of a transaction or processing elements that share a cache. For example, a first processing element for executing a software thread associated with execution of a transaction is referred to a local thread. Therefore, in the discussion above, if a store to or load from an address previously written by the first thread, which results in a cache line for the address being held in a buffered coherency state, is received, then the buffered version of the cache line is provided to the first thread since it is the local thread. In contrast, a second thread may be executing on another processing element within the same processor, but is not associated with execution of the transaction responsible for the cache line being held in the buffered state—an external thread; therefore, a load or store from the second thread to the address misses the buffered version of the cache line, and normal cache replacement is utilized to retrieve the unbuffered version of the cache line from higher level memory.

In one embodiment, processor 100 is capable of executing a compiler/optimization code 177 to compile application code 176 to support transactional execution, as well as to potentially optimize application code 176. Here, the compiler may insert operations, calls, functions, and other code to enable execution of transactions.

A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization. The intersection of transactional execution and dynamic code compilation potentially results in enabling more aggressive optimization, while retaining necessary memory ordering safeguards.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts transactional operations, calls, functions, etc. in one or more phases of compilation, such as insertion of calls/operations in a front-end phase of compilation and then transformation of the calls/operations into lower-level code during a transactional memory transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Nevertheless, despite the execution environment and dynamic or static nature of a compiler; the compiler, in one embodiment, compiles program code to enable transactional execution and/or optimize sections of program code. Therefore, reference to execution of program code or a STM environment, in one embodiment, refers to: (1) execution of a compiler program(s) or optimization code optimizer, either dynamically or statically, to compile program code, to maintain transactional structures, to perform other transaction related operations, or to optimize code; (2) execution of main program code including transactional operations/calls, such as application code that has been optimized/compiled; (3) execution of other program code, such as libraries, associated with the main program code to maintain transactional structures, to perform other transaction related operations, or to optimize code; or (4) a combination thereof.

Often within software transactional memory (STM) systems, a compiler will be utilized to insert some operations, calls, and other code in-line with application code to be compiled, while other operations, calls, functions, and code are provided separately within libraries. This potentially provides the ability of the libraries distributors to optimize and update the libraries without having to recompile the application code. As a specific example, a call to a commit function may be inserted inline within application code at a commit point of a transaction, while the commit function is separately provided in an updateable library. Additionally, the choice of where to place specific operations and calls potentially affects the efficiency of application code.

In one embodiment, processor 100 is configured to support adaptive scheduling of threads to minimize conflicts. As a result, empirical feedback may be utilized to assist thread scheduling in order to minimize conflicts between threads. So, if threads have a history of conflicting, such as causing one thread's transactions to abort too frequently, then they threads are adaptively scheduled to minimize the time that they are executing in parallel. Yet, in some embodiments, the goal of adaptive scheduling is to reduce or minimize conflicts between competing threads. But complete isolation from each other may not be beneficial. Therefore, a balance between reducing conflicts, while maintaining execution parallelism is potentially sought in the design. Alternatively, a designer may choose to avoid conflicts using adaptive scheduling techniques. Note that adaptive threading is primarily discussed in reference to adaptively scheduling a thread including a transaction. And therefore, conflicts being discussed are in regards to transactions aborted due to conflicts between threads. However, any known conflicts between threads may be utilized, such as thrashing in a cache, monopolization of a shared resource, etc. As a result, adaptive thread scheduling, such as delaying a thread to be scheduled, may be performed based on any known conflict between threads.

As an illustrative embodiment, an STM implementation/environment makes scheduling decisions between threads. For example, when a first thread makes a start transaction call, the TM system determines if a conflicting, second thread is already running. And if the second thread is both conflicting and currently running, then the first thread is adaptively scheduled to minimize the time that the first thread and second thread are executing in parallel. In one embodiment, such adaptive scheduling is performed through delaying scheduling of the first thread, which effectively offsets the simultaneous execution of conflicting threads (the first and second threads).

Although adaptive scheduling of a thread may be performed based on a limited, self-perspective view of transactions aborted within the thread itself without regard to other threads; this approach is potentially over-cautious. As an illustrative example to be utilized herein, assume threads A, B, C, D executed on thread slots 101a, 101b, 101c, and 101d, respectively. And also assume that thread A conflicted frequently with thread D (a high number of transactions in thread A aborted due to data conflicts with thread D). Upon a next attempt to schedule thread A, such as a call to start a transaction within thread A, adaptive thread scheduling may be performed. In the xenophobic view (concerned only with conflicts from thread A's perspective without taking into account which threads A conflicted with), thread A may be delayed because it encountered frequent conflicts. However, if thread D is not running on processor 100 any longer, thread A's reasons for encountering conflicts has been removed. As a result, a delay in scheduling thread A to avoid conflicts is wasteful, since the potential for conflicts has already been reduced by thread D not running on processor 100.

Therefore, in one embodiment, thread scheduling decisions for a thread may be made based on actual conflict history with other threads. Continuing the example above, when thread A is to be scheduled, its conflict rate with thread D is checked or determined. In this example, the frequent conflicts (aborts of transactions in thread A due to data conflicts with thread D) indicate that threads A and D are conflicting. As a result, thread A scheduling is delayed if thread D is currently running. However, if thread D is not currently running and thread A doesn't have frequent conflicts with threads B and C, which are running, then thread A may be normally scheduled. Consequently, the scenario where thread A is delayed even when conflicting threads are no longer running is potentially avoided, which results in more efficient scheduling. At the same time, the delay of thread A when thread D is already running minimizes the overlap of threads A and D, which potentially minimizes the chance for data conflicts between the competing threads.

Conflicts between threads, such as the aborts of transactions, may be measured/determined in any manner. In one embodiment, conflicts are determined over time. Here, a conflict ratio is determined. For a period of time, which may be a predetermined amount of time or a period of time between two defined events, a total number of transactions executed (or started) are determined along with a number of transactions aborted. The number of transactions executed is determined from the perspective of thread of interest (i.e. a number of transactions executed in thread A for the period of time). And the number of aborted transactions may be determined for thread A without regard to other threads or for thread A in regards to one or more potential competing threads, such as threads B, C, and D, based on the design implementation. Then, a conflict ratio (number of transactions aborted divided by the total number of transactions executed) is computed. Note that in some embodiments a conflict ratio (CR) may exist for each potential competing thread {i.e. CR for thread A with thread B or CR(A,B); CR(A,C); and CR(A,D)}.

The embodiment of determining a conflict ratio described above is not the only method by which conflict rate between threads may be determined. In one embodiment, a conflict rate is determined utilizing a decaying conflict ratio formula. As an example, a conflict ratio is determined recursively for each period of time. And that conflict ratio is averaged over time utilizing one or more periods of measurement. For example, equation 1 utilizes a current conflict ratio and a previous conflict ratio in determining an averaged or weighted conflict ratio.

$$CR(A,D) = p*CR1(A,D) + (1-p)*CR'(A,D) \quad \text{Equation 1}$$

In equation 1, CR(A,D) is the averaged or weighted conflict ratio, CR (A,D) is the conflict ratio for the current period, CR'(A,D) is a previous conflict ratio for a previous period, and P is a constant that is greater than or equal to 0 and less than or equal to 1. Note that the closer P becomes to one, the more biased towards the most current conflict ratio the equation becomes. As a result, P may be predetermined or dynamically adjustable. Also, if the current conflict ratio is zero or the previous conflict ratio is zero, then CR (A,D) is weighted toward the non-zero conflict ratio. In the case where CR1(A, D) is zero, the weighting towards the previous conflict ratio of CR'(A,D) still decays (reduces over periods). For example, assume that P is 0.5. So, if CR1(A,D) is zero, then CRA(A,D) becomes (1−0.5)*CR'(A,B). In other words, CRA(A,D) is equal to half the previous conflict ratio. Moreover, if no transactions are executed during a period, then that conflict ratio by default may be set to zero to avoid a divide by zero scenario.

As a result, when thread A is to be scheduled in the example above, the conflict ratio of CR(A,D) from the example is too frequent (i.e. CR(A,D) is greater than a conflict ratio threshold). However, CR(A,B) and CR(A,C) are below the conflict ratio threshold. The conflict ratio threshold may be chosen in any manner, such as a predetermined manner or dynamically. In one embodiment, the conflict threshold is adjustable based on a number of times thread A is delayed over a delay measurement period. For example, if thread A is delayed more than three times in a row, the conflict ratio threshold may be increased, such that a higher conflict ratio is needed in thread A to cause another delay. Similarly, if there are no delays and too many transaction aborts, the conflict ratio threshold may be dynamically lowered. In other words, the threshold may be chosen to allow an acceptable number of transactions to abort; either in a single thread or overall all executing threads. As it is noted above, in one embodiment, complete avoidance of running competing threads in parallel may not be an objective. But rather in this embodiment, it's important to reduce, not eliminate simultaneous execution of conflicting threads to promote concurrency by allowing different threads to execute at the same time and not serializing execution.

Regardless of setting of the threshold, it's determined if CR(A,D) is above that threshold. Then, when a call to start a transaction in thread A is to be made, it's determined if thread D is running. If thread D is running, then the call to start a transaction is delayed. For example, a call to an application interface is delayed by the transactional memory (TM) runtime environment. In this example, the delay is performed by the TM system, so controlling software, such as an Operating System (OS) or hypervisor, isn't altered. However, such a delay may be implemented in controlling software, as well as in hardware, firmware, code, or any combination thereof. In one embodiment, historically conflicting threads are occasionally and/or periodically intentionally scheduled during the same time to recalculate the conflict ratio to determine if the threads are still competing. In other words, if every time thread D is running, thread A is delayed, then it's possible that threads A and D are not executed in parallel again. But threads A and D may no longer conflict, so it may be potentially advantageous to essentially check every so often to determine threads A and D are actually still competing.

Additionally, it should be noted that FIG. 1 illustrates an abstracted, logical view of an exemplary processor with a representation of different modules, units, and/or logic. However, note that a processor utilizing the methods and apparatus' described herein need not include the illustrated units. And, the processor may omit some or all of the units shown. In addition, FIG. 1 only depicts two cores; yet, a processor may include any number of cores, such as multiple cores of the same type, as well as more than two cores that each differ in type.

FIG. 1 also illustrates an embodiment of processor that is coupled in a point-to-point fashion with an interface to an external memory controller (controller hub 170). However as discussed above, many current processors have begun including an on-processor memory interface module—an on-chip module—with different interconnection architectures, such as a ring configuration to interconnect multiple cores, as well as shared caches and other interfaces. Although not illustrated, processor 100, in one embodiment, includes a ring interconnect coupling core, cache, and memory controller components.

Here, caching agents are utilized to manage a slice of a physically distributed cache. As an example, each cache component is to manage a slice of a cache for a collocated core—a core the cache agent is associated with for purpose of managing the distributed slice of the cache. Much like cache agents handle traffic on a ring interconnect and interface with cache slices, core agents/components are to handle traffic and interface with cores. Additionally, the ring interconnect may couple Memory Controller Interface Logic (MCIL) and/or other controllers to interface with other modules, such memory and/or a graphics processor.

Furthermore, more modules and devices may be incorporated on a single integrated circuit, die, or package, such as in a System On-Chip (SOC) design. For example, a processor to support adaptive thread scheduling may be integrated with other devices, such as a graphic accelerator, a controller hub, a co-processor, a signal processor, a network processor, data storage, memory, a wireless transceiver, a flash device, an audio controller, a network controller, or other known computer system device.

Figure 3:
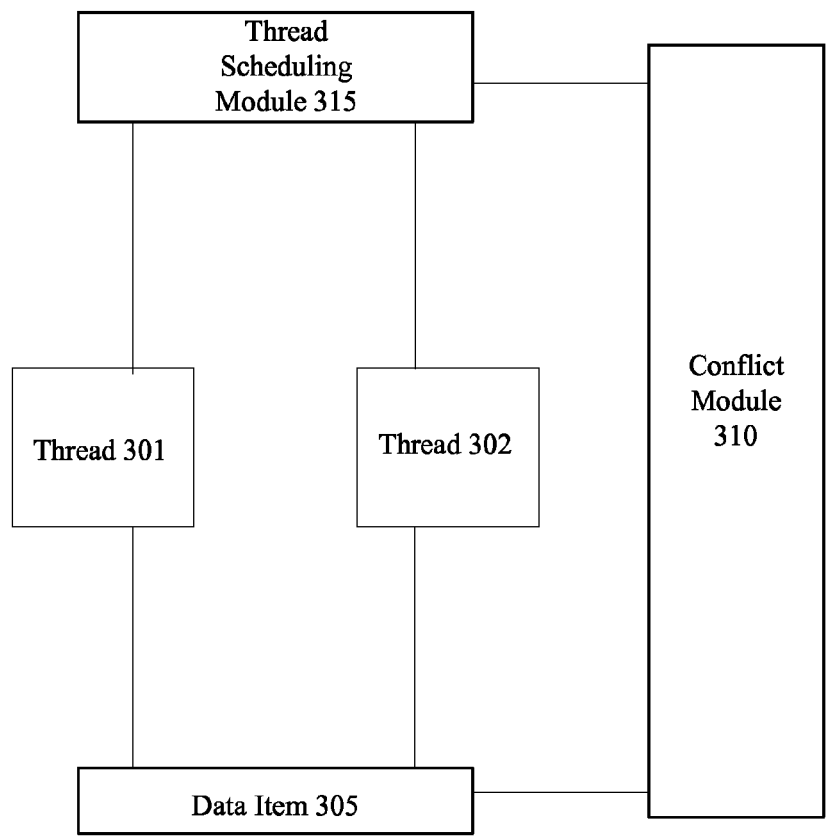
FIG. 3 illustrates an embodiment of a logical representation of modules to adaptively schedule threads based on thread conflicts.

Turning to FIG. 3, an embodiment of a logical representation of modules to adaptively schedule threads based on thread conflicts is depicted. Threads 301 and 302 are illustrated as potential competing or conflicting threads. Although they are referred to simply as threads below, threads 301 and 302 may refer software threads or physical thread slots to execute the software threads. And even though only two threads are illustrated, adaptive scheduling may be scaled to be applied to a system with any number of threads. Note that when adaptive scheduling is discussed below in reference to thread 301, thread 301 may be active in a physical thread slot, inactive, or suspended and waiting to return. In each case, processor 300 may take the same or different actions to adaptively schedule thread 301.

In one embodiment, conflict module 310 determines a conflict rate of a first thread (301) with a second thread (302). Note that determining a conflict rate between two threads (as discussed below) is purely illustrative, and it may similarly be applied recursively to other threads (whether active or inactive) in a computer system. For example, assume there are four threads; two of which are active and two of which are inactive. Conflict rate determination and tracking may be done for a first thread in regards to each of the other three threads, which results in three conflict rates or ratios. Or tracking may be done only among the two active threads, while inactive threads hold their previous conflict ratios with other active threads at that time as part of their context. As mentioned above, adaptive thread scheduling is not limited to conflict rate between threads. Instead, conflict rate may be determined for a thread of interest without regard to specific, other threads (i.e. a number of conflicts in the thread regardless of which other thread caused the conflict).

As one example, a conflict rate includes any measureable conflict between threads over time (i.e. a rate of conflicts). To illustrate assume data item 305 is held in a shared data location (e.g. a cache line) shared by threads 301 and 302. And cache control logic (not illustrated) determines a number of evictions of the cache line for thread 301 by requests from thread 302. Here, a conflict rate may include a number of evictions of thread 301's cache lines by thread 302 over time. Note that similar conflicts between thread resources, such as those resources described above in reference to FIG. 1, may be tracked for a conflict rate.

In one embodiment, the conflict rate of thread 301 with thread 302 includes a number of transactions aborted in thread 301 due to conflicts with thread 302 over an amount of time. In another embodiment, the conflict rate of thread 301 with thread 302 includes a conflict ratio of a number of transactions aborted in thread 301 due to conflicts with thread 302 over an amount of time divided by a total number of transactions executed in thread 301 over the amount of time. For example, if a total number of transactions executed for the period are 10 and the number aborted is 4, then the conflict ratio is 0.4 or 40%.

Note that the discussion immediately above in regards to a conflict ratio over time is in reference to a single quantum of time. However, a conflict ratio may be averaged over multiple periods of time (e.g. any integer number of periods greater than one). In one example, the average of conflict ratios for multiple periods is equally weighted. However, in another embodiment, the conflict ratios over multiple periods are biased or weighted. For example, equation 1 from above is recopied below.

$$CR(301,302)=p*CR1(301,302)+(1-p)*CR'(301,302) \quad \text{Equation 1}$$

Here, CR1(301, 302) includes a current conflict ratio as described above. And previous conflict ratio CR'(301, 302) includes a previous number of transactions aborted in thread 301 due to conflicts with second thread 302 during a previous amount of time over a previous number of transactions executed in first thread 301 during the previous amount of time. Furthermore, P is a constant that is greater than or equal to zero and less than or equal to one. The constant P provides the weight between the two conflict ratios to obtain the final (or averaged) conflict ratio. For example, if P is equal to 0.5, then the conflict ratios {CR1(301, 302) and CR'(301, 302)} are equally weighted. If P is greater than 0.5, then the weighted/averaged conflict ratio is biased towards the current conflict ratio, CR1(301, 302). And if P is less than 0.5, then the weighted/averaged conflict ratio is biased towards the previous conflict ratio, CR'(301, 302). In one embodiment, P is a static, predetermined constant. Alternatively, P is dynamically adjustable during runtime, such as based on a number of times scheduling of the first thread is actually delayed.

Although the bias formula (equation 1) is for two periods of conflict ratios, a conflict ratio may be averaged or weighted over more than two periods. Also, as mentioned above, it's worth noting that equation 1 decays over multiple periods when no new transactions are executed in thread 301. Here, if a number of total transactions in a period or amount of time is zero, the CR1(301, 302) is set to zero to avoid the divide by zero scenario. And equation 1 becomes only based on the previous conflict ratio of (1−P_)*CR'(301, 302). As a result, unless P is equal to 0, then CR'(301, 302) is multiplied by a fraction less than one, which leaves a lower CR(301, 302) as compared to the previous CR'(301, 302). Also note that upon subsequent recalculation of CR(301, 302), the new CR'(301, 302) may be the fully recalculated, be the averaged conflict ratio, CR(301, 302), from the previous period, or be the current conflict ratio, CR1(301,302), from the previous period of calculated conflict ratio.

As aforementioned, conflict ratios may be calculated by conflict mode 310 using a number of transactions aborted and a total number of transactions executed during an amount of time (a period). As the most straightforward illustrative example, counters are utilized to track (or count) the number of transactions started or executed, as well as the number of those aborted. Here, such counters may be implemented in hardware, software, firmware, or a combination thereof. In a hardware example, a hardware transaction counter is incremented each time a transaction is started, committed, executed, or retired. And if an abort of transaction occurs (i.e. a conflict in cache due to coherence protocols and tracking mechanisms is detected) then the abort counter is incremented. Each counter is reset at the beginning of the period and holds the final count (total transactions and aborts, respectively).

In a software example, code is executed to keep a count, such as a variable count of transactions executed and aborted over time. For example, when a begin transaction instruction is compiled, encountered, or executed, a transaction count variable is incremented (i.e. the hardware location designated for the software transaction count variable is incremented in response to the execution of code from the software environment, such as a STM environment). Similarly, when a call to a conflict handler or an abort is detected by software, it similarly increments a software abort count. Here, the transactional memory system may, when executing during runtime, maintain metadata to indicate what thread caused a conflict, such that the correct counters (i.e. an abort counter for the correct thread) is incremented. For example, if four threads are running and there is a conflict between the first and fourth threads, then the transactional memory system holds such information. In this case, three count variables for transactions aborted may be kept for thread 1 (thread 1 versus thread 2, thread 1 versus thread 3, and thread 1 versus thread 4). As a result of the transactional memory system information, the count for thread 1 versus thread 4 is correctly incremented based on the transactional memory system metadata information.

Therefore, in one embodiment, conflict module 310 includes one or more software counters (as described above) and a storage medium holding code, when executed, to cause the software counter to track the number of transactions aborted in the first thread due to conflicts with the second thread over the amount of time. As stated above, the code may be part of an STM environment, such as part of a transaction library, which when executed during runtime provides the 'counter' updates. Note that use of the term 'software counter' refers to code, when executed by hardware, causing the hardware to store values indicated by the software (i.e. an abort memory location for an abort count that is incremented by a value of 1 in response to software upon an abort of a transaction). Therefore, even use of the term 'software counter' refers to the transformation of a tangible device, such as a storage medium, to keep the count as directed by software.

Conflict rate has been discussed above in reference to conflicts over an amount of time or during a period. However, any measurement of rate may be utilized. As a first example, the amount of time includes a temporal value (i.e. a specific or predetermined amount of time). However, use of the term 'amount of time' may also refer to the change in time between specific events. Note that in the first scenario (using a specified amount of time) the measurement durations are periodic and in the second scenario (between events) the periods may vary but are not required to change. Note that the events may be synchronous (tied to or in response to an instruction) or asynchronous (not directly relatable to an instruction). For example, a calculation time threshold is predetermined. And upon each start of a transaction, a current time period is checked against the threshold. If the current time period is less than the threshold, then the previously calculated conflict ratio is utilized. However, if the current time period is greater than the threshold, then the conflict ratio is recalculated.

As an illustrative example, assume a period of conflict recalculation is 1 second. A first period of calculation may actually occur at one second. Upon execution of a first transaction (T1), a conflict ratio is calculated. 100 ms before the 1 second threshold, a second transaction (T2) is executed. Here, the threshold has not been exceeded, so the previous calculated conflict ratio is utilized. Then assume that another transaction (T3) is not executed until 1.5 seconds after the calculation from T1. As a result of the period exceeding the one second threshold, a new conflict ratio is calculated. As can be seen from this example, the calculation periods (amounts of time) are not always periodic or equal (i.e. the first duration for calculation was one second and the second period was one second in the example above).

Therefore despite the actual measurement of a period for conflict rate determination, in one embodiment the conflict rate is determined at every period by conflict module 310. Alternatively, the raw data (transactions and aborts) are kept current and the conflict rate is calculated on-demand by conflict module 310. For example, when a call to a start transaction is made, the conflict rate is calculated in response to the start transaction call. However, calculation upon every period allows for the conflict rate to be readily available, which potentially enables immediate scheduling without having to wait for a calculation if the conflict ratio is not too high.

Any known method of determining with conflict module 310 if a conflict rate is too high may be utilized. In one embodiment, conflict module 310 is to determine if the conflict rate is greater than a conflict rate threshold. For example, when a conflict ratio is used, then the conflict ratio is compared with a conflict ratio threshold. And since a conflict ratio typically results in a number that is less than or equal to one (or a percentage when converted), then the conflict threshold may similarly include a number less than or equal to one, a percentage, or other known representation of a fraction or ratio. As a result, if a conflict ratio is greater than (or equal to in some embodiments) a conflict threshold, then the conflict rate is deemed 'too high.' As can be seen, the term 'too high' is relative to the threshold. Therefore, the conflict threshold, in one alternative embodiment to a static threshold, is dynamically alterable/adjustable during runtime. Any known efficiency or factor may be used to base the adjustment of a threshold. For example, if a thread has been delayed too many times (either over a period or consecutively), then the threshold may be adjusted. In one embodiment, a purpose of the adjustment is to reduce conflicts by delaying conflicting threads, while not eliminating concurrency between competing or conflicting threads.

In one embodiment, thread scheduling module 315 is adapted to determine if thread 302 is running before scheduling thread 301 and to delay scheduling of thread 301 in response to conflict module 310 determining the conflict rate of the thread 301 with thread 302 is too high and thread 302 is running. As an illustrative example, assume thread 302 is to make a call to start a transaction. At this point, thread scheduling module 315 in conjunction with conflict module 310 determines if any threads conflict with thread 301. In other words, they determine if a conflict rate with a thread, such as thread 302, is greater than a conflict ratio. Here, conflict module 310 may have done the comparison upon the conflict rate calculation every period and stored a representation of the results. For example, a bitmap for thread 301 corresponding to each other thread may be updated with a conflict value to indicate threads that conflict (have too high of conflict rate) with thread 301. Alternatively, conflict module 310 may perform the calculation, threshold comparison, or both upon demand.

Either way, assuming that the conflict rate for thread 302 with thread 301 is over the conflict threshold, then thread scheduling module 315 determines if a conflicting thread (thread 302) is currently running. Note that in an alternative implementation, it's determined what threads are running or scheduled. And then those threads are checked to determine if they are conflicting. The choice of implementation may be static or dynamic to achieve the quickest determination based on whether it would be faster to determine which of all threads conflict first or what threads are running first.

Determining if a thread is running may be done in any known manner. In one embodiment, a status of a thread is held in hardware, software, firmware, or a combination thereof. And thread scheduling module 315 is able to glean this information from any of those structures. A thread 'running' may have many different meanings. However, in one embodiment, a thread running includes any state that could potentially cause a data conflict with a transaction executing on our thread of interest. Examples of such a state include active, ready to be scheduled, executing, executing a transaction, etc.

If thread 302 is both running and determined to be a conflicting thread, then thread scheduling module 315 adaptively schedules thread 301. In one embodiment, adaptive scheduling includes delaying thread 301 either for a specified amount of time, a random amount of time, or until a specified event occurs (a cache miss, thread 302 becoming inactive, an access to a specified location, a timer expiration, etc). Note that the use of the term 'delaying scheduling,' in one embodiment, specifically refers to the actual delay of the scheduling process for an instruction, thread, or operation (or omission to schedule for the delay period). In another embodiment, delaying of scheduling refers to a delay introduced somewhere in the pipeline that effectively delays scheduling of an instruction, thread, or operation in response to the introduced delay. For example, delay of scheduling may include delaying a context switch of a thread to be scheduled. Although the scheduling process is not directly delayed, the delay in the context switch effectively translates into delaying the scheduling of instructions from the thread that would have occurred earlier were it not for the introduced delay in the context switch.

In one embodiment, thread scheduling module 315 includes a storage medium holding a transactional memory library, when executed, to delay a call for thread 301 to an application interface to privileged, controlling software in response to determining the conflict rate of thread 301 with thread 302 is too high and that thread 302 is running. As an example, a start transaction call, when executed, calls a start transaction routine/function in the transactional memory library. The transactional memory library code, when executed, checks with conflict module 310's information as described above to determine if thread 302 conflicts with thread 301. And a transactional memory runtime scheduler delays a call for the transaction from thread 301 to an application program interface (API) for controlling software (e.g. an Operating System, a hypervisor, a kernel, etc.) in response to determining that thread 302 is running and conflicts too often with thread 301. In this scenario, the transactional runtime environment provides the delay, which potentially doesn't include any changes to the OS or hardware. In other words, the efficiency of adaptive scheduling may be provided by the transactional runtime environment itself without having to require OS suppliers or hardware suppliers to alter their product. Although adaptive thread scheduling may be implemented in controlling software or hardware as well.

In another embodiment, hardware is configured to delay scheduling of a thread, an instruction from a thread, an operation, etc. As a first example, a hardware scheduler is configured to delay scheduling of an instruction from thread 301 in response to the conflict module determining the conflict rate of thread 301 with thread 302 is too high and the thread scheduling module 315 determining thread 302 is running. Here, dispatch of an instruction to an execution unit may be delayed for an amount of time. For example, an instruction or operation to start a transaction is delayed, such that a start of a transaction is delayed and cannot abort from conflict with thread 302 until it is started after the delay. Yet, any delay in a pipeline may be inserted that effectively delays thread 301 from executing instructions or operations that would conflict As one example, context switch logic is configured to delay a switch of the thread 302 into a physical thread unit in response to conflict module 310 determining the conflict rate of thread 301 with thread 302 is too high and the thread scheduling module 315 determines thread 302 is running. Here, thread 302 may be inactive. And when it's to be switched in to a physical thread unit, it's determined if thread 302 (a competing thread) is active in a physical thread unit. If thread 302 is active, the context switch is delayed, which inevitably delays scheduling of instructions, such as start transaction instructions.

Figure 4:
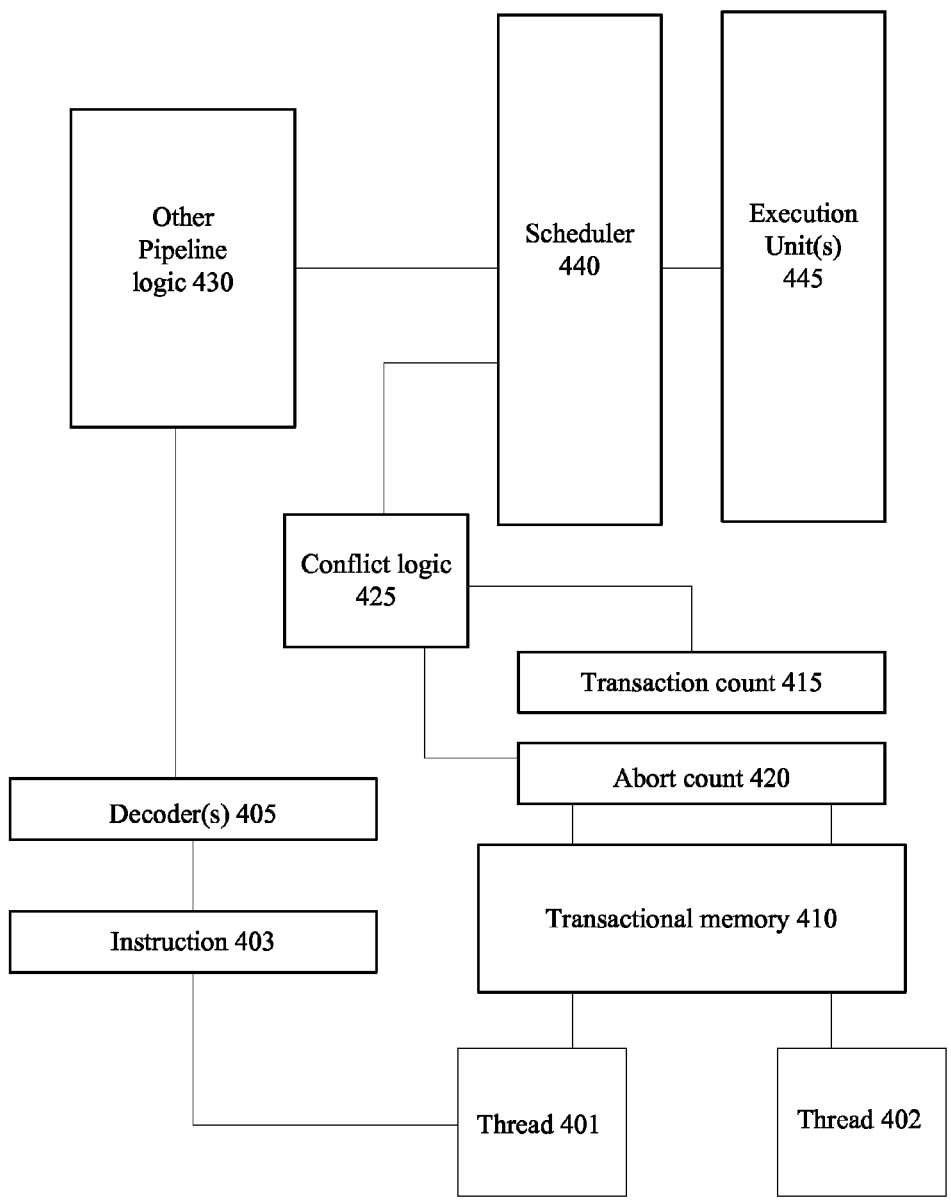
FIG. 4 illustrates an embodiment of a logical representation of modules to adaptively schedule threads based on thread conflicts.

However, adaptive thread scheduling to minimize conflicts doesn't have to be exclusively implemented in only hardware or software. Instead, a hybrid implementation may be utilized. For example, hardware counters are configured to track the number of transactions aborted in thread 301 due to conflicts with thread 302 over the amount of time and the total number of transactions executed in the thread 301 over the amount of time. And a storage medium including transactional runtime code, when executed, is to cause execution logic to determine the conflict ratio from the number of transactions aborted and the total number of transactions held in the counters. In addition, the transaction runtime code, when executed, delays a call to an application interface to privileged, controlling software in response to determining the conflict rate of thread 301 with thread 302 is too high and the thread scheduling module determining thread 302 is running Referring to FIG. 4, an embodiment of a logical representation of logic configured to adaptively schedule threads based on thread conflicts is illustrated. In one embodiment, processor 400 is capable of executing hardware transactions. Threads 401 and 402 are to share access to transactional memory 410, such as a cache memory. And tracking mechanisms in conjunction with coherence protocol, such as those described above in reference to FIGS. 1 and 2, are able to detect conflicts and cause transactions to abort.

Here, assume a start transaction instruction 403 is fetched for thread 401 to start a transaction. Decoders 405 decode the instruction and other pipeline logic 430 perform predetermined operations specifically in response to start transaction instruction 403 based on the identification of instruction 403 by its operation code (opcode) with decoder(s) 405. During the transaction thread 401 and 402 may conflict (i.e. a read after write, write after read, or write after write between the threads) as detected by hardware, such as cache memory 410. And thread 401's transaction may be aborted.

Similar to the discussion above these transactions and aborts thereof are tracked. In one embodiment, hardware counters 415 and 420 are reset at the beginning of a tracking period. And the transaction count 415 is incremented for each transaction that is executed by thread 401 for the time period. Note that transaction counter 415 may be incremented at any stage in the pipeline, such as upon decode of start transaction instruction 403, decode of an end transaction instruction, retirement of one of those instruction, etc. Similarly, each time an abort of a transaction in thread 401 is detected during the period of time abort count 420 is incremented. For example, when hardware detects a conflict for a transaction executing in thread 401, hardware counter 415 is configured to be incremented. In another embodiment, transaction counter 415 is replicated for multiple, potential competing threads. Consequently, transaction counter 415 in this scenario is dedicated to tracking conflicts/aborts between thread 401 and thread 402. So if there is an abort of a transaction in thread 401 due to a thread other than thread 402, then counter 415 in this case is not incremented. Also note that counters 415, 420 may be implemented as accumulators, instead of counters. And instead of using the count directly, the delta between the count at a start of the calculation period and an end of the calculation period is utilized (e.g. instead of using a transaction count of 10 transactions executed, an accumulator count of 30 transaction at the end of the calculation period less the accumulator count of 20 at the beginning of the period results in the same 10 transactions executed).

Conflict logic 425 is configured to determine a conflict metric for a first thread 401 and thread 402 over an amount of time. For example, the conflict metric includes a conflict ratio for thread 401 with regard to thread 402. Here, the conflict logic is configured to determine the transactional conflict ratio. As discussed above, in one embodiment, the conflict ratio includes a number of transactions aborted in thread 401 (counter value 420) based on conflicts with thread 402 over a total number of transactions executed in the thread 401 over the amount of time (counter value 415). Note that the period or amount of time may include any amount of time, which may be defined by events disposed on each side of the time period, such as a previous execution of a start transaction instruction and a current execution of a start transaction instruction.

And if a request to schedule from thread 401 is received when thread 402 is currently running, executing, and/or active and the conflict metric is greater than a conflict threshold, then scheduler logic 440 is configured to delay scheduling from or of thread 401 for execution on execution units 445. For example, hardware scheduler 440 is to delay scheduling a start transaction instruction 403 from thread 401 in response to the start transaction instruction 403 being available for scheduling and thread 402 being currently active for execution, while the conflict ratio is higher than the conflict ratio threshold. Note from the discussion above that the conflict threshold, in some embodiments, is dynamically increased in response to scheduler logic 440 delaying scheduling of thread 401 for execution more than a delay threshold over a delay time frame. Here, a longer period of time than the conflict ratio measurement may be utilized to observe how many times thread 401 is delayed. In this instance, the conflict ratio threshold is adjusted to increase or decrease the amount of times thread 401 is delayed. And as aforementioned, a delay of thread 401 may be ignored to intentionally schedule conflicting/competing threads at the same time to ensure they truly are still conflicting.

Figure 5:
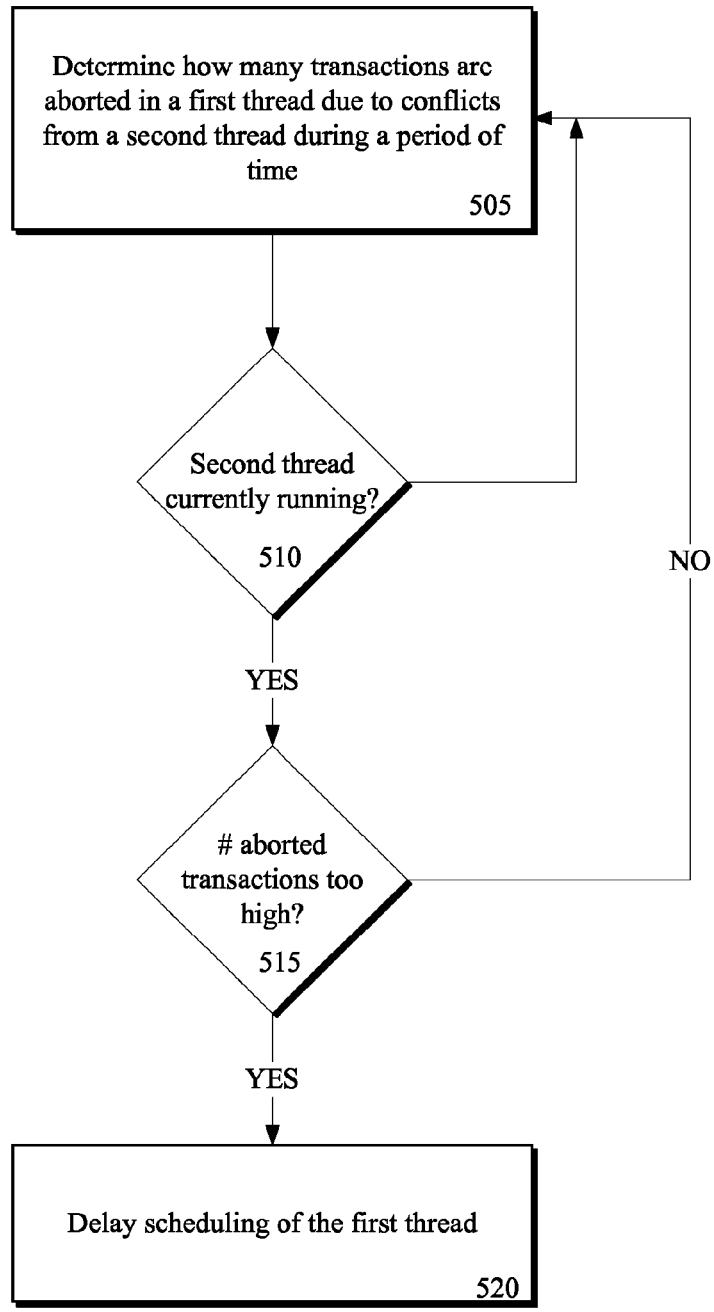
FIG. 5 illustrates an embodiment of a flow diagram for a method of delaying scheduling of a thread based on conflicts with currently running threads.
Figure 6:
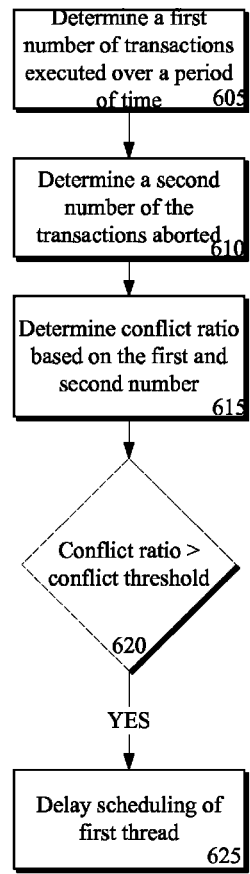
FIG. 6 illustrates an embodiment of a flow diagram for a method of adaptively scheduling threads based on thread conflicts.
Figure 7:
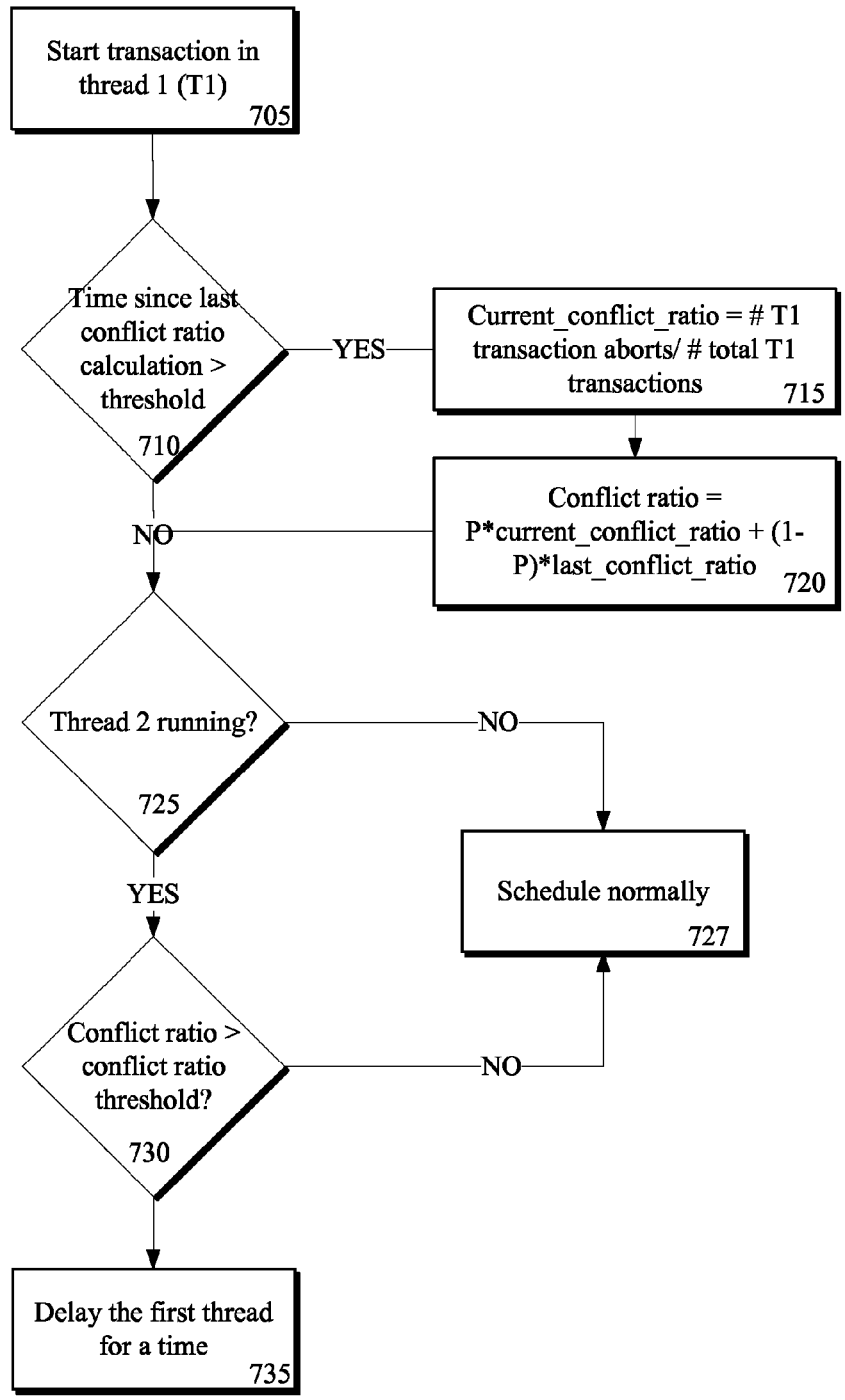
FIG. 7 illustrates another embodiment of a flow diagram for a method of adaptively scheduling threads based on thread conflicts.

Moving to FIG. 5, an embodiment of a flow diagram for a method of delaying scheduling of a thread based on conflicts with currently running threads is shown. Note that the flows for the flow diagrams of FIGS. 5-7 are illustrated in a substantially serial fashion with a listed order of flows. However, both the serial nature of these flows, as well as the depicted order, are not required. For example, in reference to FIG. 5, based on the design implementation, a designer may elect to perform flow 515 (# transaction for a thread are too high?) before determining if a thread is currently running (flow 510). Also, flow 605 and 610 are illustrated in a linear or serial fashion. However, determining transactions executed an aborted are often performed in parallel over the same time period. In addition, any of the illustrated flows may be performed within hardware, software, firmware, or a combination thereof. Moreover, any program code in the form of one or more instructions or operations, when executed, may cause a machine to perform the flows illustrated and described below.

In flow 505, a first number of transactions that are aborted over a period of time in a first thread due to conflicts with a second thread are determined. As a first example, an abort count for a first thread in regards to the second thread is incremented (either by software, hardware, firmware, or a combination thereof) in response to an abort of a transaction, which is responsive to a conflict between a transaction of the first thread and an access by the second thread.

In flow 510, it's determined if a second thread is running. As noted above, this may be done through a software query to hardware, a checking hardware of a status for a thread, a check to see if the thread has outstanding instructions/operation for scheduling or are not retired, a software maintained status of a thread, or a combination thereof. Note that when determining if a thread is currently running is performed before flow 515, the system is essentially determining the current active or running thread set (i.e. all threads that could potentially conflict with the thread of interest, which is the thread to be scheduled).

In flow 515, of that thread set, it's determined if the number of transactions aborted due to conflicts for each of those threads in the thread set are too high (i.e. above an abort threshold). Although the discussion here is in reference to aborts between specific threads, the number of aborts may include aborts in the thread unrelated to which thread caused the conflict. Or the aborts may be determined with regard to a group of threads, such as a group of threads executing on a specific core of the processor.

At either flow 510 or 515, if a potential conflicting thread is either not running or the number of aborts attributed to the conflicting thread is not above the threshold, then the scheduling or execution for the first thread continues normally. However, if the second thread is both running and caused too many aborts, such as indicated by a conflict ratio that is either averaged over periods or over the most recent period, then scheduling of the first thread is delayed in flow 520. In one embodiment, delaying scheduling of the first thread is performed by a controlling software scheduler in response to a start of a transaction within the first thread. In this example, delaying scheduling of the first thread includes delaying a call to an application interface, such as an Application Program Interface (API), for the controlling software in response to the start of the transaction within the first thread. However, any of the methods and apparatus' described herein may be utilized for delaying a thread based on a xenophobic view of aborts; a current, most-recent conflict ratio; an averaged or weighted conflict ratio; or any other known method of determining conflicts between threads.

Referencing FIG. 6, an embodiment of a flow diagram for a method of adaptively scheduling threads based on thread conflicts is depicted. In flow 605 a first number of transactions executed in a first thread over a period of time is determined. And in flow 510, a second number of transactions of the first number of transactions executed over the period of time that are aborted in response to conflicts with a second thread is determined. These 'counts' may be kept in hardware (counters, registers, etc.) either at the direction of hardware itself, software (e.g. in response to execution of Software Transactional Memory (STM) runtime code), firmware, or a combination thereof.

In flow 615, a conflict ratio based on the first number of transactions (605) and the second number of transactions (610) is determined. For example, the conflict ratio is determined from a formula including M/N, wherein N includes the first number of transactions and M includes the second number of transactions. In another embodiment, the conflict ratio formula includes: $P*M/N+(1-p)*X/Y$, wherein N includes the first number of transactions, M includes the second number of transactions, Y includes a third number of transactions in the first thread executed over a previous period of time, X includes a fourth number of transactions in the first thread aborted during the previous period of time, and p includes a constant that is greater than or equal to zero and less than or equal to one. And as noted above, P may be a static constant or a dynamic constant that is varied over time.

In flow 620, it's determined if the conflict ratio is greater than a conflict threshold. And if it is, then scheduling of the first thread is delayed in flow 625. As a result, it can be said that the scheduling of the first thread is then delayed in response to the second thread currently running and the conflict ratio being above a conflict threshold. As a first example, delaying scheduling of a thread includes delaying a return to the first thread. As another illustrative example, delaying scheduling of a thread includes delaying an application interface call for the first thread. As yet another example, delaying scheduling of a thread includes introducing delay into a processor pipeline or delaying a context switch for the first thread.

In regards to FIG. 7, an embodiment of a flow diagram for a method of adaptively scheduling threads based on thread conflicts is presented. In flow 705, a transaction is started in a first thread (T1), such as through execution of a begin transaction instruction. In flow 710, a time since the last conflict ratio calculation is determined. If the time is greater than a threshold, then a conflict ratio is calculated in flows 715 and

720. Note that the amount of times or periods (even consecutive periods) for a conflict ratio calculation in this example may not be identical. Instead, new conflict ratios are calculated at the beginning of transactions when the time since the last calculation exceeds an allotted amount of time (the threshold).

In flow 715 the current conflict ratio is determined. For example, the number of transactions aborted in T1 due to another thread, such as T2, is divided by the total number of transactions executed in T1 since the last conflict ratio calculation. And then the averaged or weighted conflict ratio is determined in flow 720 through equation 1, which is recopied below.

$$\text{Averaged\_conflict\_ratio}(A,D) = p * \text{current\_conflict\_ratio}(T1,T2) + (1-p) * \text{previous\_conflict\_ratio}(T1,T2) \quad \text{Equation 1}$$

And whether the averaged conflict ratio is recalculated (coming from flow 720) or a current averaged conflict ratio that has been previously calculated an amount of time in the past that hasn't exceed the calculation threshold (coming directly from flow 710), it's determined if T2 is running in flow 725. If T2 is not running, then T1 is scheduled normally in flow 727. However, if T2 is running, then it's determined if the averaged conflict ratio is greater than a conflict ratio threshold in flow 730. If the conflict ratio does not exceed the threshold, then T1 is scheduled normally in flow 727. However, if the conflict ratio is greater than the threshold, then the first thread is delayed for a time in flow 735.

Therefore, as can be seen above, threads are adaptively scheduled based on conflicts with other threads, which potentially minimizes conflicts between threads, while maintaining concurrent execution benefits. Moreover, delaying of threads may be based on conflicts with specific, individual threads. So when a thread of interest is to be scheduled and only threads that don't conflict too often with the thread of interest are running, the thread of interest may be scheduled normally. Furthermore, even between specific competing threads, they may be periodically scheduled for intentional concurrent executed to re-check if the threads are still conflicting.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a conflict module adapted to determine a conflict rate of a first thread with a second thread, wherein the conflict rate of the first thread with the second thread is to be based on a conflict ratio of the number of transactions aborted in the first thread due to data conflicts with the second thread over an amount of time divided by a total number of transactions executed in the first thread over the amount of time; and
   a thread scheduling module adapted to:
   delay scheduling of the first thread in response to the conflict module determining the conflict rate of the first thread with the second thread is too high and determining the second thread is being executed.

2. The apparatus of claim 1, wherein the amount of time includes a period of time selected from a group consisting of a predetermined amount of time, an amount of time between synchronous events, an amount of time between asynchronous events, and an amount of time between predetermined events.

3. The apparatus of claim 1, wherein the conflict module includes a software counter and a storage medium holding conflict handler code, when executed, to cause the software counter to track the number of transactions aborted in the first thread due to conflicts with the second thread over the amount of time.

4. The apparatus of claim 1, wherein a previous conflict ratio includes a previous number of transactions aborted in the first thread due to conflicts with the second thread during a previous amount of time over a previous number of transactions in the first thread during the previous amount of time, and wherein the conflict rate further comprises: P*conflict ratio+(1−P)*the previous conflict ratio, where P is a constant that is greater than or equal to zero and less than or equal to one.

5. The apparatus of claim 4, wherein P is dynamically adjustable during runtime based on a number of times scheduling of the first thread is delayed.

6. The apparatus of claim 1, wherein a conflict module adapted to determine a conflict rate of a first thread with a second thread is too high comprises the conflict module being adapted to determine the conflict ratio is greater than a conflict ratio threshold.

7. The apparatus of claim 6, wherein the conflict ratio threshold is dynamically adjustable during runtime.

8. The apparatus of claim 1, wherein the thread scheduling module adapted to delay scheduling of the first thread in response to the conflict module determining the conflict rate of the first thread with the second thread is too high and the thread scheduling module determining the second thread is running comprises: the thread scheduling module including a storage medium holding a transactional memory library, when executed, to delay a call to an application interface to privileged, controlling software in response to determining the conflict rate of the first thread with the second thread is too high and the thread scheduling module determining the second thread is running.

9. The apparatus of claim 1, wherein the thread scheduling module adapted to delay scheduling of the first thread in response to the conflict module determining the conflict rate of the first thread with the second thread is too high and the thread scheduling module determining the second thread is running comprises: a hardware scheduler configured to delay scheduling of an instruction from the first thread in response to the conflict module determining the conflict rate of the first thread with the second thread is too high and the thread scheduling module determining the second thread is running.

10. The apparatus of claim 1, wherein the thread scheduling module adapted to delay scheduling of the first thread in response to the conflict module determining the conflict rate of the first thread with the second thread is too high and the thread scheduling module determining the second thread is running comprises: context switch logic configured to delay a switch of the first thread into a physical thread unit in response to the conflict module determining the conflict rate of the first thread with the second thread is too high and the thread scheduling module determining the second thread is running.

11. The apparatus of claim 1, wherein the conflict module adapted to determine a conflict rate of a first thread with a second thread is too high comprises: hardware counters configured to track the number of transactions aborted in the first thread due to conflicts with the second thread over the amount of time and the total number of transactions executed in the first thread over the amount of time and a storage medium including transactional runtime code, when executed, to cause execution logic to determine the conflict ratio from the number of transactions aborted and the total number of transactions, and wherein the thread scheduling modules comprises the storage medium including the transaction runtime code, when executed to delay a call to an application interface to privileged, controlling software in response to determining the conflict rate of the first thread with the second thread is too high and the thread scheduling module determining the second thread is running.

12. An apparatus comprising:
conflict logic configured to determine a transactional conflict ratio for a first thread with a second thread over the amount of time, wherein the conflict ratio comprises a number of transactions in the first thread aborted based on conflicts with the second thread over a total number of transactions executed in the first thread over the amount of time and
scheduler logic configured to delay scheduling the first thread for execution in response to a request to schedule the first thread when the second thread is currently executing and the conflict metric is greater than a conflict threshold.

13. The apparatus of claim 12, wherein the conflict logic configured to determine a conflict metric for a first thread with a second thread over an amount of time comprises: the conflict logic being configured to determine a transactional conflict ratio for a first thread with the second thread over the amount of time, wherein the conflict ratio comprises a number of transactions in the first thread aborted based on conflicts with the second thread over a total number of transactions executed in the first thread over the amount of time.

14. The apparatus of claim 13, wherein the conflict logic comprises a first hardware counter configured to be incremented in response to an abort of a transaction in the first thread of the number of transaction aborted in the first thread and a second hardware counter configured to be incremented in response to encountering a transaction in the first thread of the total number of transactions executed in the first thread.

15. The apparatus of claim 12, wherein the scheduler logic configured to delay scheduling the first thread for execution in response to a request to schedule the first thread when the second thread is currently executing and the conflict metric is greater than a conflict threshold comprises: a hardware scheduler to delay scheduling a start transaction instruction from the first thread in response to the start transaction instruction being available for scheduling and the second thread being currently active for execution.

16. The apparatus of claim 12, wherein the conflict threshold is dynamically increased in response to the scheduler logic delaying scheduling of the first thread for execution more than a delay threshold over a delay time frame.

17. A non-transitory machine readable medium including software schedule code, when executed by a machine, causes the machine to:
determine a first number of transactions in a first thread aborted over a period of time due to transactional data conflicts with a second thread in comparison to a total number of transactions over a period of time and
delay scheduling of the first thread in response to a start of a transaction within the first thread when the second thread is currently running based on the first number of transactions in the first thread aborted over a period of time due to transactional data conflicts with a second thread.

18. The machine readable medium of claim 17, wherein determining a first number of transactions in a first thread aborted over a period of time due to transactional data conflicts with a second thread comprises: incrementing an abort count for a first thread in regards to the second thread in response to an abort of the first transaction responsive to a transactional data conflict between a transaction of the first thread and a data access by the second thread.

19. The machine readable medium of claim 17, wherein delaying scheduling of the first thread in response to a start of a transaction within the first thread when the second thread is currently running based on the first number of transactions in the first thread aborted over the period of time comprises: delaying a call to an application interface in response to the start of the transaction within the first thread when the second thread is currently running based on the first number of transactions in the first thread aborted over the period of time.

20. The machine readable medium of claim 1, wherein delaying scheduling of the first thread with a controlling software scheduler in response to a start of a transaction within the first thread when the second thread is currently running based on the first number of transactions in the first thread aborted over the period of time further comprises: delaying the call to the application interface for the controlling software in response to the start of the transaction within the first thread when the second thread is currently running and the first number of transactions in the first thread aborted over the period of time being greater than an abort threshold over the period of time.

21. The machine readable medium of claim 19, wherein delaying scheduling of the first thread with a controlling software scheduler in response to a start of a transaction within the first thread when the second thread is currently running based on the first number of transactions in the first thread aborted over the period of time further comprises: delaying the call to the application interface for the controlling software in response to the start of the transaction within the first thread when the second thread is currently running and the first number of transactions in the first thread aborted over the period of time divided by a total number of transactions from the first thread executed over the period of time being greater than a conflict ratio threshold.

22. A method comprising:
  determining a first number of transactions in a first thread executed over a period of time;
  determining a second number of transactions of the first number of transactions executed over the period of time that are aborted in response to conflicts with a second thread;
  determining a conflict ratio based on the first number of transactions and the second number of transactions, wherein determining a conflict ratio based on the first number of transactions and the second number of transactions comprises determining the conflict ratio from a formula including: $P*M/N+(1-p)*X/Y$, wherein N includes the first number of transactions, M includes the second number of transactions, Y includes a third number of transactions in the first thread executed over a previous period of time, X includes a fourth number of transactions in the first thread aborted during the previous period of time, and p includes a constant that is greater than or equal to zero and less than or equal to one and
  delaying scheduling of the first thread in response to the second thread currently running and the conflict ratio being above a conflict threshold.

23. The method of claim 22, wherein determining a first number of transactions in a first thread executed over a period of time and determining a second number of transactions of the first number of transactions executed over the period of time that are aborted in response to conflicts with a second thread are performed in response to execution of Software Transactional Memory (STM) runtime code.

24. The method of claim 22, wherein determining a first number of transactions in a first thread executed over a period of time and determining a second number of transactions of the first number of transactions executed over the period of time that are aborted in response to conflicts with a second thread are performed in hardware.

25. The method of claim 22, wherein determining a conflict ratio based on the first number of transactions and the second number of transactions comprises determining the conflict ratio from a formula including M/N, wherein N includes the first number of transactions and M includes the second number of transactions.

26. The method of claim 22, wherein delaying scheduling of the first thread in response to the second thread currently running and the conflict ratio being above a conflict threshold comprises delaying a return to the first thread in response to the second thread currently running and the conflict ratio being above a conflict threshold.

27. The method of claim 22, wherein delaying scheduling of the first thread in response to the second thread currently running and the conflict ratio being above a conflict threshold comprises: delaying an application interface call for the first thread in response to the second thread currently running and the conflict ratio being above a conflict threshold.

* * * * *